United States Patent Office 3,157,705
Patented Nov. 17, 1964

3,157,705
PRODUCTION OF ALCOHOLS
Norman Henry Pearce, Hull, England, assignor to The Distillers Company Limited, Edinburgh, Scotland, a British company
No Drawing. Filed Nov. 28, 1960, Ser. No. 71,918
Claims priority, application Great Britain Jan. 6, 1960
7 Claims. (Cl. 260—631)

The present invention relates to the production of alcohols by hydrolysing organic halides with water.

The invention is a process of producing an alcohol which comprises contacting an aliphatic or aralkyl halide, other than a fluoride, with water and an N:N'dialkyl amide of a saturated carboxylic acid.

The aliphatic or aralkyl halide may be, for example, an alkyl, cycloalkyl, alkenyl or alkynyl halide. The halide may be a chloride, bromide or iodide.

The N:N'dialkyl amide of a saturated carboxylic acid may be, for example, N:N'dimethyl acetamide; the preferred amide is N:N'dimethylformamide.

The process may be conveniently carried out by dispersing the halide in the N:N'dialkyl amide, and contacting the dispersion with water, preferably at a temperature between 15° C. and the boiling point of the mixture of the dispersion and water. Preferably the proportion of water present in the process, with respect to the halide, is at least the stoichiometric proportion.

The process may be carried out at superatmospheric pressure, but it is preferably carried out at substantially atmospheric pressure.

Hydrogen halide is produced by the process of the invention and the N:N'dialkyl amide is converted to its salt with the hydrogen halide. The N:N'dialkyl amide may be recovered by adding a stronger base to the salt, as the invention proceeds or at the end of the reaction. If desired, the stronger base may be added to the mixture of the halide, water and N:N'dialkyl amide at the beginning of the process, preferably in a proportion more than sufficient to neutralise all the hydrogen halide produce in the process.

The alcohol may be recovered by a conventional method, such as fractional distillation. The following examples further illustrate the invention.

Example 1

10.1 parts by weight of water were added to a solution of 10.1 parts by weight of n-butyl bromide in 25.5 parts by weight of N:N'dimethyl formamide and the resulting mixture was boiled with reflux for 4 hours.

98% of the n-butyl bromide was converted into n-butanol, 2% remaining unchanged; the yield of n-butanol based on the halide consumed was 100%.

Example 2

9.9 parts by weight of water were added to a solution of 10.1 parts by weight of secondary butyl bromide in 24.0 parts by weight of N:N'dimethyl formamide and the resulting mixture was boiled under reflux for 2 hours.

97% of the secondary butyl bromide was converted into secondary butanol, 3% remaining unchanged; the yield of secondary butanol based on the halide consumed was 100%.

Example 3

10.6 parts by weight of water were added to a solution of 11.3 parts by weight of cyclohexyl chloride in 31.7 parts by weight of N:N'dimethyl formamide and the resulting mixture was boiled under reflux for 3 hours.

92.0% of the cyclohexyl chloride was converted into cyclohexanol, 7.7% remaining unchanged; the yield of cyclohexanol based on the halide was nearly 100%.

I claim:

1. A process of producing an alcohol which comprises dispersing a halide selected from the group consisting of lower alkyl and cyclohexyl chlorides, bromides and iodides in an N:N'dimethyl amide of a saturated carboxylic acid and contacting the dispersion with water selected from the group consisting of formic acid and acetic acid, at a temperature between 15° C. and the boiling point of the reaction mixture.

2. A process as claimed in claim 1 wherein at least the stoichiometric proportion of water is present with respect to the halide.

3. A process as claim in claim 1 wherein the N:N'dimethyl amide of a saturated carboxylic acid is N:N'dimethyl formamide.

4. A process of producing an alcohol which comprises dispersing a halide selected from the group consisting of lower alkyl and cyclohexyl chlorides, bromides and iodides in an N:N'dimethyl amide of a saturated carboxylic acid selected from the group consisting of formic acid and acetic acid and contacting the dispersion with water, at a temperature between 15° C. and the boiling point of the reaction mixture, under atmospheric pressure.

5. A process of producing n-butanol which comprises, dispersing n-butyl bromide in N:N'dimethyl formamide, contacting the dispersion with water and subjecting the mixture to reflux until substantially complete conversion of the bromide to n-butanol is achieved.

6. A process of producing secondary butanol which comprises dispersing secondary butyl bromide in N:N'dimethyl formamide, contacting the dispersion with water and subjecting the mixture to reflux until substantially complete conversion of the bromide to secondary butanol is achieved.

7. A process of producing cyclohexanol which comprises dispersing cyclohexyl chloride in N:N'dimethyl formamide, contacting the dispersion with water and subjecting the mixture to reflux until substantially complete conversion of the chloride to cyclohexanol is achieved.

References Cited in the file of this patent

UNITED STATES PATENTS 2,072,016   Tamele et al. _____ Feb. 23, 1937

FOREIGN PATENTS 361,042   Germany _____ Oct. 9, 1922

OTHER REFERENCES

Fieser et al.: Organic Chemistry (2nd ed.), page 115 (1950).